United States Patent
Sao et al.

(10) Patent No.: US 7,760,682 B2
(45) Date of Patent: Jul. 20, 2010

(54) BASE STATION, CONTROL STATION AND RADIO COMMUNICATION CONTROL METHOD

(75) Inventors: Tomoki Sao, Yokohama (JP); Hiroyuki Ishii, Yokosuka (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 898 days.

(21) Appl. No.: 11/508,320

(22) Filed: Aug. 23, 2006

(65) Prior Publication Data

US 2007/0049345 A1 Mar. 1, 2007

(30) Foreign Application Priority Data

Aug. 25, 2005 (JP) .............................. 2005-244489

(51) Int. Cl.
*H04W 4/00* (2009.01)
(52) U.S. Cl. ...................................... 370/328
(58) Field of Classification Search ........................ None
See application file for complete search history.

(56) References Cited

U.S. PATENT DOCUMENTS

2004/0071108 A1* 4/2004 Wigell et al. ................ 370/328
2005/0259663 A1 11/2005 Ode et al.

FOREIGN PATENT DOCUMENTS

| GB | 2 361 392 A | 10/2001 |
|---|---|---|
| GB | 2 399 989 A | 9/2004 |
| JP | 2002-77987 A | 3/2002 |
| JP | 2004-200838 A | 7/2004 |
| JP | 2005-57323 A | 3/2005 |
| WO | WO 02/076023 A1 | 9/2002 |
| WO | WO 03/047155 A1 | 6/2003 |
| WO | WO 2004/075589 A1 | 2/2004 |

OTHER PUBLICATIONS

Pedersen et al, Mobility Management and Capacity Analysis for High Speed Downlink Packet Access in WCDMA, IEEE, 5 pages, 2004.*
European Search Report dated Dec. 29, 2006 (six (6) pages).
3GPP, "$3^{rd}$ Generation Partnership Project; Technical Specification Group Radio Access Network; Physical layer aspects of UTRA High Speed Downlink Packet Access", 3GPP TR 25.848 V4.0.0 (Mar. 2001), pp. 1-89.
3GPP2, "cdma2000 High Rate Packet Data Air Interface Specification" Chapter 11—MAC Layer, 3GPP2 C.S0024-A v1.0 (Mar. 2004), pp. 11.0-11.309.

* cited by examiner

*Primary Examiner*—Frank Duong
(74) *Attorney, Agent, or Firm*—Crowell & Moring LLP

(57) ABSTRACT

To provide a base station, a control station, and a radio communication control method which can prevent occurrence of breakage of data sending toward a mobile station or data loss at a cell change. An inflow amount controlling function 4021 of a source base station 40a controls the amount of inflow data from a control station 50 to the source base station 40a by sending an inflow amount control signal indicating "inflow amount zero" to the control station 50 at a timing earlier than a cell change timing Tc by a cell change waiting time tw.

7 Claims, 11 Drawing Sheets

BASE STATION, CONTROL STATION AND RADIO COMMUNICATION CONTROL METHOD

BACKGROUND OF THE INVENTION

1. Field of the Invention

The present invention relates to a base station, a control station, and a radio communication control method for controlling switching at a cell change in a mobile communication system.

2. Description of the Related Art

The common mobile communication system using cellular phones provides a communication service by dividing the entire service area into radio zones called cells. Such a system consists of a plurality of base stations covering cells, mobile stations communicating with the base stations by establishing radio channels with the base stations, and control stations managing the plurality of base stations. The control station is connected with a core network including a switching equipment and the like. In such a configuration, data transmission in a communication between a core network and a mobile station is performed through a control station and a base station. The base station has a function of temporally buffering data sent from the core network and the control station so as to relay between a wired zone between the core network, the control station and the base station, and a radio zone between the base station and the mobile station, in particular. A high-speed, large-capacity downlink high-speed packet communication such as the HSDPA (High Speed Downlink Packet Access) or 1x EV-DO is standardized and still being developed (for example, see "3GPP TR25.848 v4.0.0" and "3GPP2 C. S0024 Rev.1.0.0"). Such a high-speed packet communication method is mainly characterized in that an adaptive modulation and coding method is adopted according to a radio condition of the mobile station that is performing data reception. In the adaptive modulation and coding method, a radio transmission rate can be changed in time according to a radio condition of the mobile station. In the HSDPA, for example, throughput is improved by controlling a modulation scheme of a radio channel, a number of High Speed-Physical Downlink Shared Channel (HS-PDSCH) codes, and a coding rate according to a radio condition between a mobile station and a base station.

It is noted that the control station is called "Radio network controller" in the 3GPP system.

In a mobile communication system with the abovementioned configuration, when a transmission rate of the wired zone is higher than a transmission rate of the radio zone, data tends to accumulate in a temporary buffer of a relaying base station. When a transmission rate of the wired zone is lower than a transmission rate of the radio zone, data tends to be exhausted in a temporary buffer of a relaying base station. The temporary buffer of the relaying base station is limited. Data which overflow the buffer is discarded or the buffer of the relaying base station is exhausted and a radio resource cannot be efficiently used. Therefore, a difference between the transmission rate of the radio zone and the transmission rate of the wired zone may cause degradation of transmission efficiency lead by discarding of a data due to a buffer overflow or a lowering of an efficiency of a radio resource usage due to exhaustion of a buffer. It is needed to control to match the transmission rate of the radio zone and the transmission rate of the wired zone as much as possible to solve the two problems.

From a viewpoint of restraint of discarding of a data at a base station in a communication between a core network and a mobile station, a method for controlling the amount of inflow data from a control station to a base station based on the amount of data retained in a buffer of a base station has been proposed (for example, see JP2002-77987A). Also in a communication system such as a high-speed packet communication method in which a transmission rate in the radio zone largely fluctuates, a method for preventing degradation of transmission efficiency of a system caused by degradation of efficiency of radio resource usage due to exhaustion of a buffer and occurrence of a resending control caused by discarding of a data due to over flow of a buffer has been proposed (for example, see JP2005-57323A).

Referring to FIG. 12, a method for controlling the amount of inflow data disclosed in JP2002-77987A and JP2005-57323A will be described. Signals unnecessary for the description will be omitted.

First, when a control station is receiving data destined to a mobile station from a core network, the control station sends the data toward a base station in accordance with a transmission rate of the base station (step S601).

The base station sends the data at the radio transmission rate toward the mobile station (step S602). If the base station receives data at a transmission rate faster than the radio transmission rate, it cannot immediately send the data, thus, it temporally stores the data in a buffer of the base station (step S603).

At this moment, the amount of data stored in the buffer divided by the radio transmission rate is a "buffer retention time", which is a time for sending all the data in the buffer. The base station monitors whether the buffer retention time exceeds a threshold or not. If the buffer retention time exceeds the threshold, the base station notifies "an inflow amount control signal" for controlling the inflow amount from a control station 50 by a sub-layer signal (step S604). The control station 50 that received the inflow amount control signal sends the data based on the amount of sent out data specified in the control signal.

To the contrary, if the radio transmission rate increases (step S606) and the amount of buffer (buffer retention time) decreases (step S607) to less than the threshold, while data are being sent (step S605), the base station notifies the control station of information for releasing sending control by a sublayer signal (step S608). The control station that received the information for releasing the control changes the amount of sent out data based on the amount of sent out data specified in the control information. By using the method, the inflow amount to the base station can be restricted with the amount of buffer retention and overflow of a buffer at a base station can be avoided.

When a mobile station moves across cells in such a mobile communication system, switching of a base station called a cell change is done. At the cell change occasion, the control station first sends a control signal for the cell change to inform a source base station and a target base station of a timing of the cell change. At this moment, the above-mentioned controlling of the inflow amount of data from the control station to a base station has not been considered. Here, a "source base station" is defined as the base station from which the mobile station receives data before the cell change, and a "target base station" is defined as the base station from which the mobile station receives data after the cell change.

In a packet communication such as the abovementioned HSDPA, when a cell change occurs between base stations, a control station sends "a control signal of a cell change" to inform a source base station and a target base station of a timing of the cell change. It switches its destination so that downlink data flows from the control station to the target base station at the timing. There was a problem in that data sending is stopped until all the operation of the cell change finishes, i.e. continuous communication cannot be achieved. In a method for sending data to achieve continuous communication even after a control signal of the cell change is received, if data flowed from a control station to a source base station remains and the source base station cannot send all the remaining data before the cell change timing, the data cannot be correctly received by the mobile station. There was a problem in that, unless the data does not appropriately flow from the control station to the target base station, continuous communication cannot be achieved.

The invention is adapted in view of the abovementioned problems, and intends to provide a base station, a control station and a radio communication control method which can prevent breakage of data sending toward the mobile station or data loss at the cell change.

SUMMARY OF THE INVENTION

In order to solve the abovementioned problems, the invention according to claim 1 provides a base station in a mobile communication system including a plurality of base stations controlled by a control station and a mobile station that communicates with the base stations, including inflow amount control means for controlling the amount of inflow data from the control station to the base station (which is called "the source base station" hereafter) by sending a control signal to the control station at a cell change that changes a base station communicating with the mobile station from the source base station to another base station.

According to the invention, as the source base station can control the amount of inflow data to the source base station at the cell change that changes the base station communicating with the mobile station from the source base station to another base station, it can prevent occurrence of breakage of data sending toward the mobile station or data loss by appropriately controlling the amount of inflow data.

The invention according to claim 2 is the source base station according to claim 1, wherein the inflow amount control means sends the control signal to the control station at a timing earlier than a cell change timing by a cell change waiting time.

According to the invention, as the source base station can control the amount of inflow data from the control station so that data in the buffer of the source base station is sent to the mobile station until the cell change timing by sending a control signal to the control station at a timing earlier by the cell change waiting time, it can prevent occurrence of breakage of data sending toward the mobile station or data loss.

The invention according to claim 3 is the source base station according to claim 2, further including calculating means for calculating the cell change waiting time, wherein the calculating means calculates a time until all the data in the buffer of the source base station is sent to the mobile station as the cell change waiting time.

According to the invention, as the source base station can send all the data in the buffer of the source base station to the mobile station in the cell change waiting time, it can prevent occurrence of breakage of data sending toward the mobile station or data loss.

The invention according to claim 4 is the source base station according to claim 3, wherein the calculation means calculates the cell change waiting time based on the amount of data in the buffer of the source base station, the amount of inflow data from the control station, and a radio transmission rate to the mobile station.

According to the invention, an appropriate cell change waiting time can be easily calculated based on information that can be easily obtained.

The invention according to claim 5 is the source base station according to claim 1, wherein the inflow amount control means sends a signal for controlling to make the amount of inflow data zero.

According to the invention, as the source base station controls more easily than in the case where the amount of inflow data is not zero by controlling to make the amount of inflow data zero, and it can easily calculate the cell change waiting time.

The invention according to claim 6 is the source base station according to claim 1, wherein the inflow amount control means controls the amount of inflow data from the control station to the source base station by sending the control signal to the control station, when the source base station becomes the target base station in response to the cell change.

With the configuration, it can prevent data loss or deterioration of transmission efficiency by controlling the amount of inflow data even after the cell change.

The invention according to claim 7 provides a control station in a mobile communication system including a plurality of base stations controlled by the control station and a mobile station for communicating with the base stations, including inflow amount control means for controlling the amount of inflow data to a source base station based on the control signal received from the source base station at a cell change that changes a base station communicating with a mobile station.

According to the invention, as the control station can control the amount of inflow data to the source base station at the cell change, it can prevent occurrence of breakage of data sending toward the mobile station or data loss by appropriately controlling the amount of inflow data.

The invention according to claim 8 provides a radio communication control method performed in a mobile communication system including a plurality of base stations controlled by a control station and a mobile station that communicates with the base stations, including a cell change timing notifying step in which the control station notifies a source base station of a cell change timing, a control signal sending step in which the source base station sends a control signal to the control station at a timing earlier than the cell change timing notified at the cell change timing notifying step by a cell change waiting time, and an amount of inflow data control step in which the control station controls the amount of inflow data to be sent to the source base station based on the control signal sent at the control signal sending step.

According to the invention, as it can control amount of inflow data to the source base station at a cell change, it can prevent occurrence of breakage of data sending toward the mobile station or data loss by appropriately controlling the amount of inflow data.

According to the present invention, as the source base station can control the amount of inflow data toward the source base station at a cell change that changes the base station communicating with the mobile station from the source base station to another base station, it can prevent occurrence of breakage of data sending toward the mobile station or data loss by appropriately controlling the amount of inflow data.

DETAILED DESCRIPTION OF THE PREFERRED EMBODIMENTS

An embodiment of the present invention will be described in detail with reference to drawings.

Figure 1:
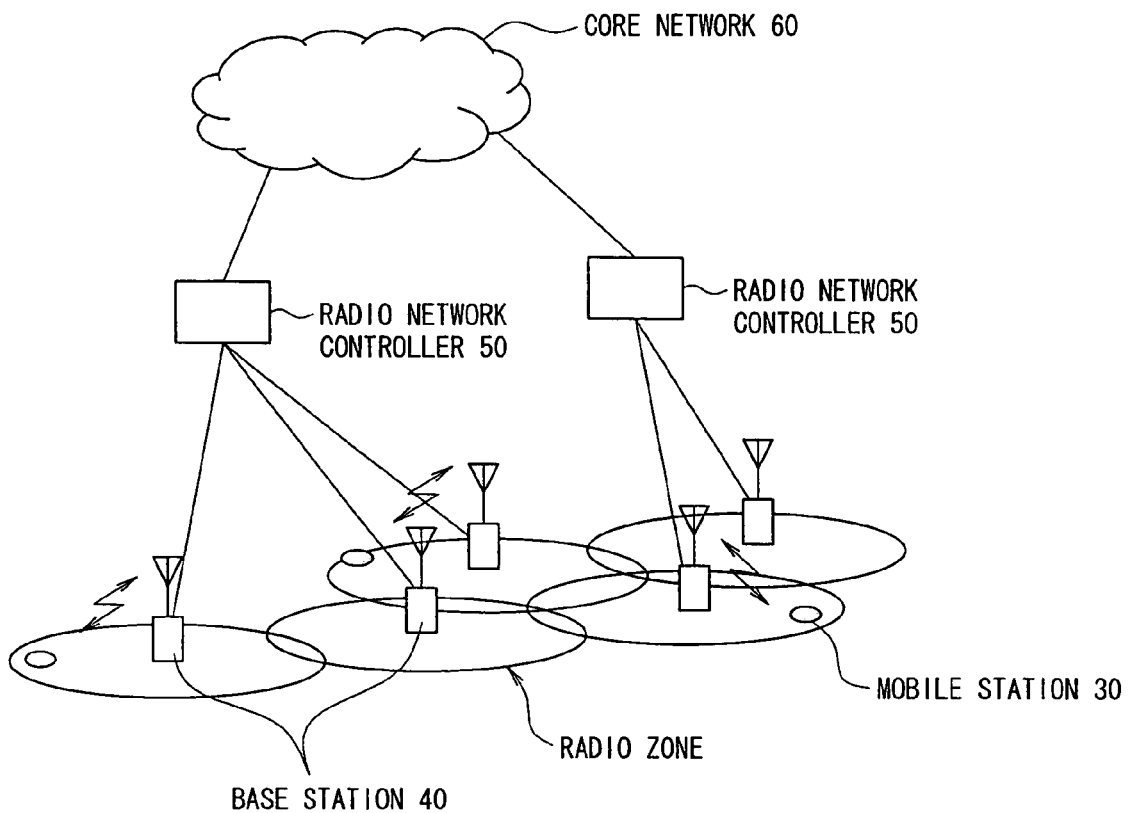
FIG. 1 is a diagram showing the configuration of the entire mobile communication system according to an embodiment of the present invention.

FIG. 1 is a diagram showing the configuration of the entire mobile communication system according to an embodiment of the present invention. The mobile communication system consists of a core network 60 including a switching equipment, a radio network controller 50 functioning as a control station, and a base station 40 arranged in hierarchy. The mobile station 30 communicates with the base station 40 via a radio channel. The radio network controller 50 is a control device for controlling over a plurality of base stations 40.

Figure 2:
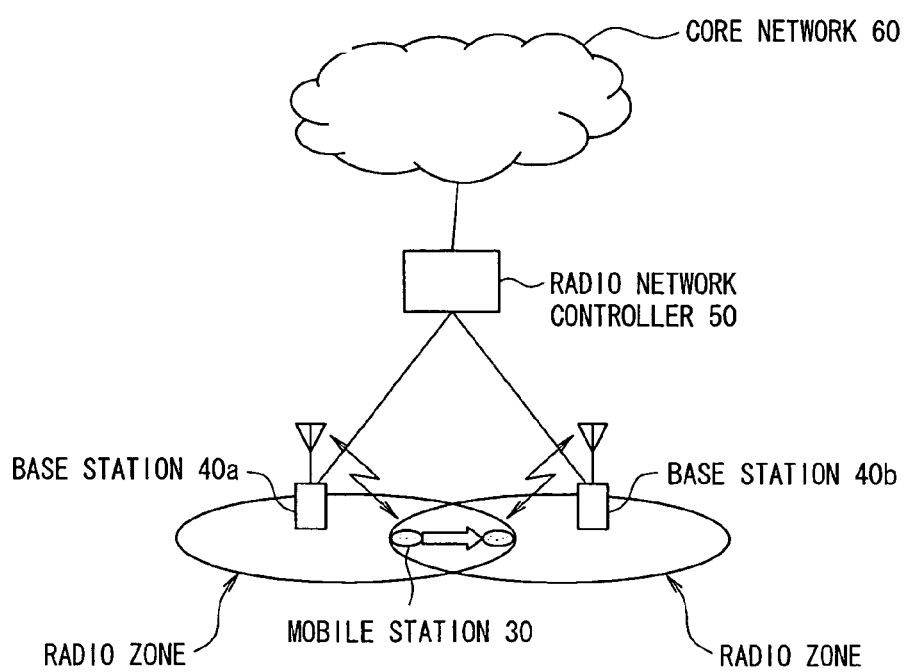
FIG. 2 is a diagram showing an example of a cell change according to the embodiment.

FIG. 2 shows an example of a case where a cell change is performed. As shown in the figure, if the mobile station 30 is in a radio zone of the base station 40a and moves into a radio zone of the base station 40b while it is communicating with the base station 40a, the base station communicating with the mobile station 30 is changed from the base station 40a to the base station 40b. The switching of the base station is called a cell change. In the above description, the base station 40a is called "source base station", and the base station 40b is called "target base station".

Figure 3:
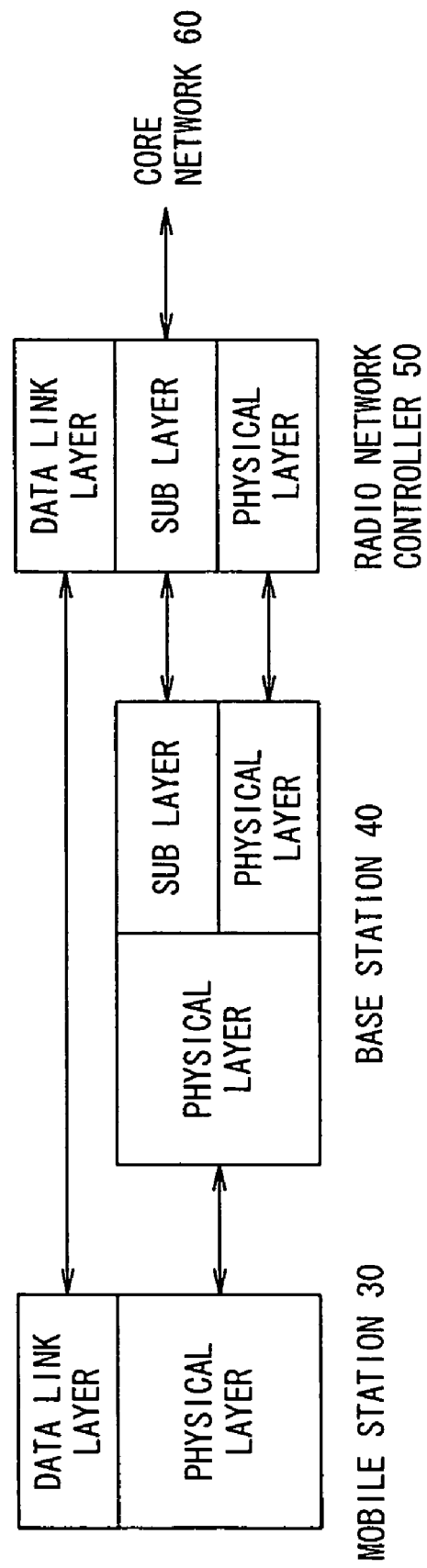
FIG. 3 is a view showing protocol stacks in a mobile communication network according to the embodiment.

FIG. 3 shows protocol stacks in a mobile communication network shown in FIG. 1. The protocol stacks of the mobile station 30 consists of a physical layer opposite to the base station 40 and a data link layer opposite to the radio network controller 50.

The protocol stacks of the base station 40 consist of a physical layer opposite to the mobile station 30 and a physical layer and a sub layer opposite to the radio network controller 50.

The protocol stack of the radio network controller 50 consists of a physical layer and a sub layer opposite to the base station 40 and a data link layer opposite to the mobile station 30 as well as a layer (not shown) opposite to the core network 60. Here, the abovementioned sub layers are layers for exchanging a control signal between the radio network controller 50 and the base station 40.

Figure 4:
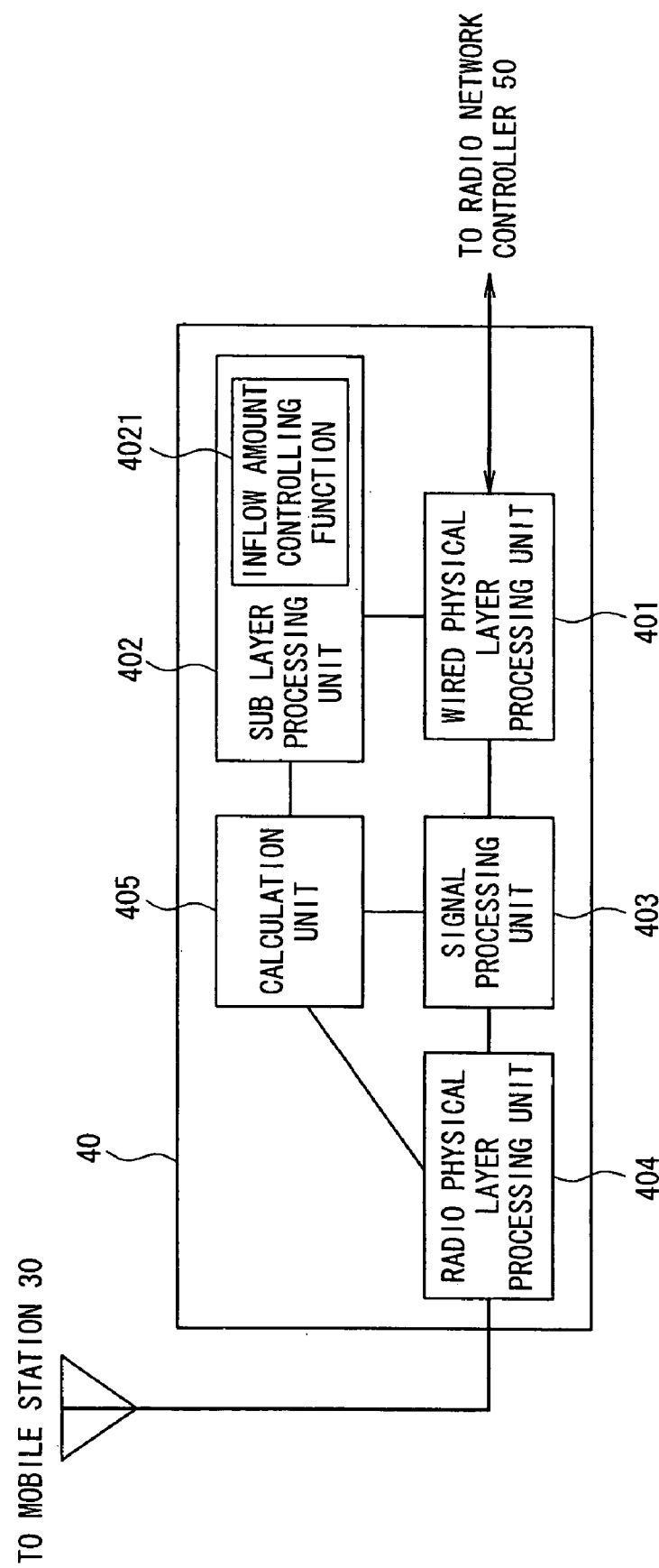
FIG. 4 is a view showing a configuration of a base station according to the embodiment.

FIG. 4 shows a configuration of the base station 40 as shown in FIG. 1.

A wired physical layer processing unit 401 communicates with the radio network controller 50.

A sub layer processing unit 402 communicates with the radio network controller 50 on control signals.

A sub layer processing unit 402 has an inflow amount controlling function 4021. The inflow amount control function 4021 sends to the radio network controller 50 inflow amount control signals for controlling the amount of inflow data from the radio network controller 50 to the base station 40.

A signal processing unit 403 performs signal relaying processing between the mobile station 30 and the radio network controller 50 or temporally storage (buffering) of data into a buffer in the base station 40.

A radio physical layer processing unit 404 communicates with the mobile station 30.

A calculation unit 405 performs various calculations. For example, the calculation unit 405 calculates a cell change waiting time based on the amount of data in the buffer of the base station 40, the amount of inflow data from the radio network controller 50, and a radio transmission rate to the mobile station 30. Here, the amount of inflow data can be represented by the amount of data that flows in for each unit time.

The radio transmission rate to the mobile station 30 can be measured by monitoring the radio physical layer processing unit 404. The amount of inflow data can be measured by monitoring the wired physical layer processing unit 401. The amount of retained data in the buffer of the base station 40 can be measured as the signal processing unit 403 is monitored.

When the base station 40 becomes a target base station in response to a cell change, the calculation unit 405 calculates an appropriate amount of inflow data from the radio network controller 50 based on radio transmission rate and the like of the base station 40 and notifies it from the sub layer processing unit 402 to the radio network controller 50.

Figure 5:
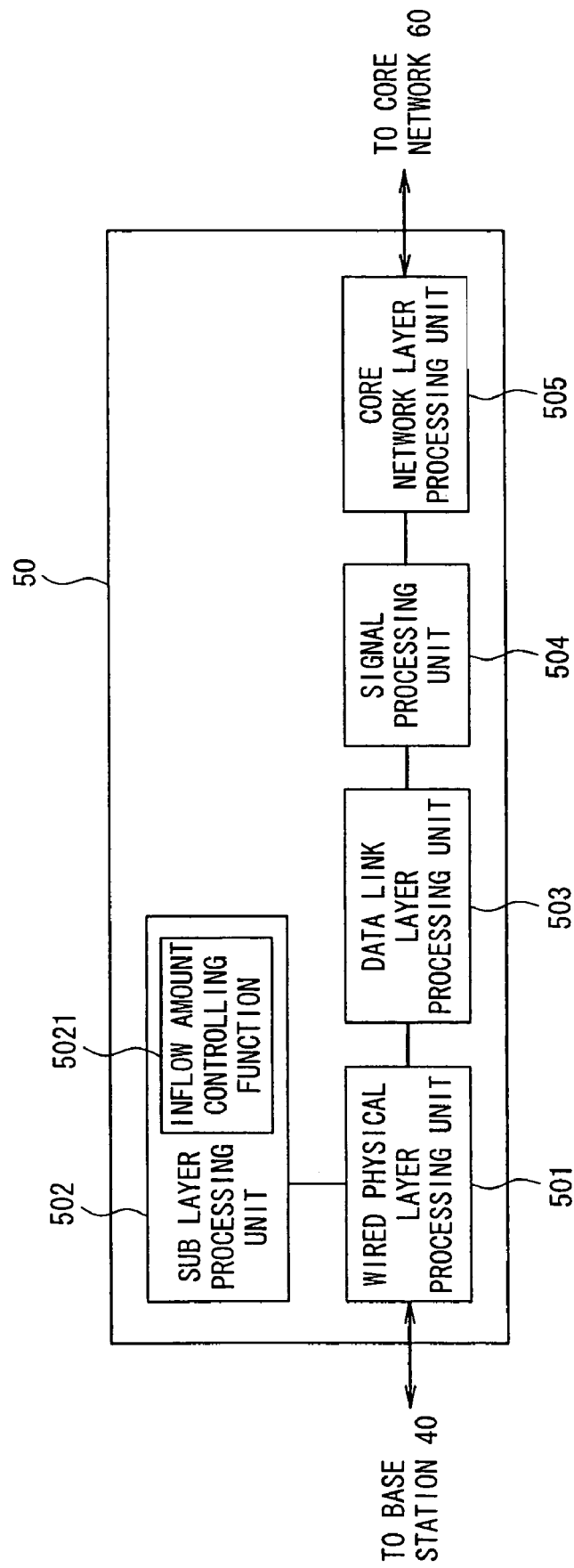
FIG. 5 is a view showing a configuration of a radio network controller according to the embodiment.

FIG. 5 shows a configuration of the radio network controller 50 shown in FIG. 1.

A wired physical layer processing unit 501 communicates with the base station 40.

A sub layer processing unit 502 communicates with the base station 40 on control signals. A sub layer processing unit 502 has an inflow amount controlling function 5021. The inflow amount controlling function 5021 controls the amount of inflow data from the radio network controller 50 to the base station 40 based on "inflow amount control signals" sent from the base station 40.

The data link layer processing unit 503 communicates with the mobile station 30. A signal processing unit 504 performs signal relaying processing or buffering between the mobile station 30 and the core network 60. A core network layer processing unit 505 communicates with the core network 60.

Figure 6:
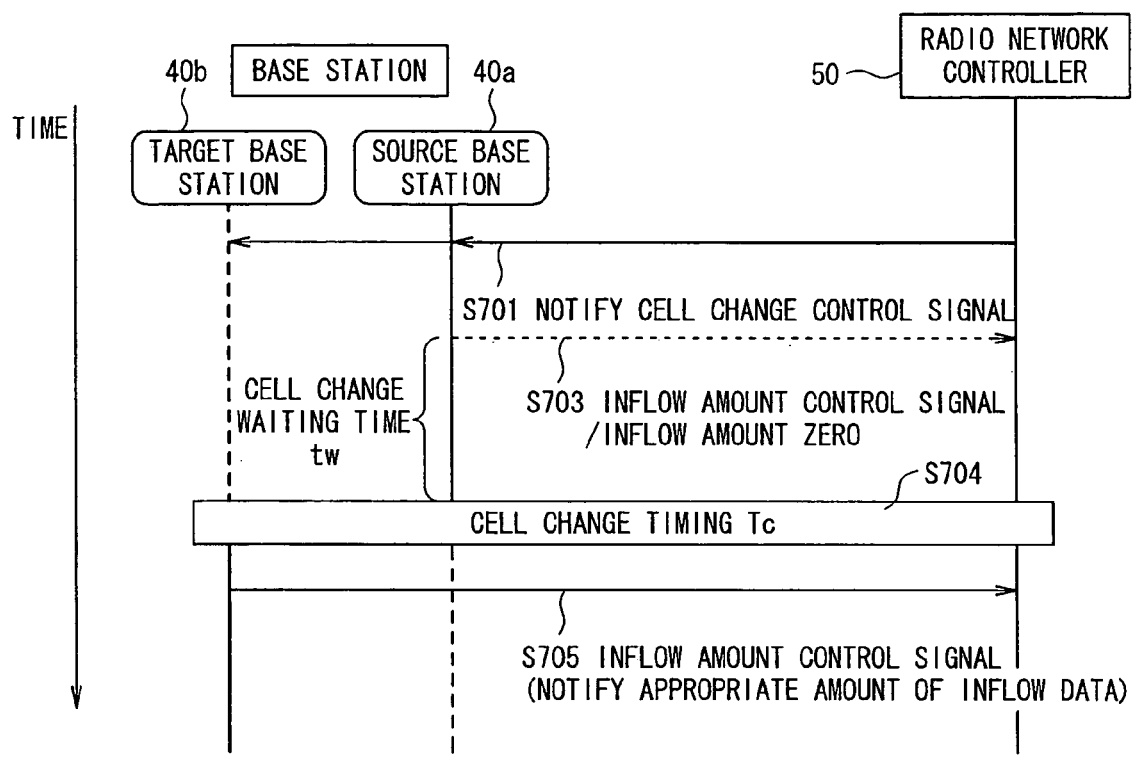
FIG. 6 is a sequence diagram showing an operation example at a cell change according to the embodiment.
Figure 7:
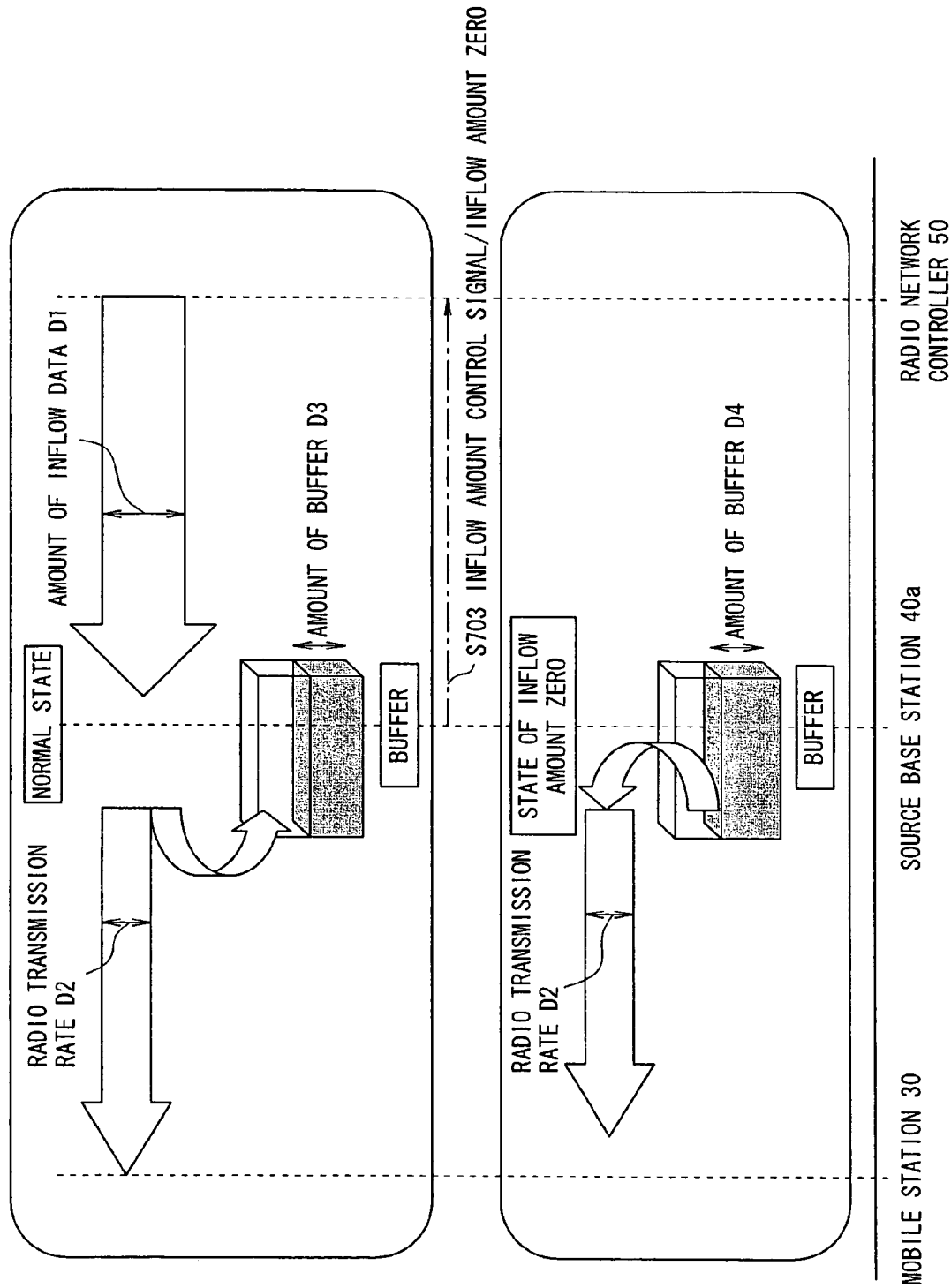
FIG. 7 is a diagram showing relationship between pieces of data in an operation example according to the embodiment.

Next, referring to the sequence diagram shown in FIG. 6, an operation example in a case where the base station with which the mobile station 30 communicates at a cell change is changed from the source base station 40a to the target base station 40b. Relationship between pieces of data at that moment is shown in FIG. 7. The same reference numerals are given to the same parts in FIG. 6 and FIG. 7.

In a usual state, as shown in FIG. 7, the inflow amount controlling function 4021 of the source base station 40a communicates by restricting the amount of inflow data D1 based on the amount of buffer D3 retained in the buffer of the source base station 40a and avoiding overflow of the buffer.

At the cell change, the radio network controller 50 sends a cell change control signal and informs the timing Tc of the cell change to the source base station 40a and the target base station 40b (step S701 of FIG. 6).

The source base station 40a that received the cell change control signal sends an inflow amount control signal indicating "inflow amount zero" to the radio network controller 50 by using the inflow amount controlling function 4021 at a timing before a cell change timing Tc by a cell change waiting time tw (early timing) (step S703 of FIG. 6 and FIG. 7). Here the "cell change waiting time tw" is assumed to be a time in which the source base station 40a can send data buffered in the source base station 40a to the mobile station 30. In the operation example, a numeral of the cell change waiting time tw is assumed to be determined in advance and stored in a memory of the source base station 40a.

When the radio network controller 50 receives the inflow amount control signal from the source base station 40a, it stops data sending to the source base station 40a by using an inflow amount controlling function 5021 based on the inflow amount indicated by the control signal. That makes the amount of inflow data from the radio network controller 50 into the source base station 40a zero, and as shown in FIG. 7, data sent from the source base station 40a into the mobile station 30 is only data D4 in a buffer retained in the source base station 40a. If all the data in the buffer can be sent to the mobile station 30 until the cell change timing, data loss can be restricted.

Thereafter, the radio network controller 50 performs the switching at the cell change timing Tc which is previously notified to the source base station 40a and the target base station 40b (step S704 of FIG. 6).

At the same time, the target base station 40b notifies an appropriate amount of inflow data by a inflow amount control signal (step S705). Here, as an appropriate amount of inflow data is, for example, what calculated from a radio transmission rate in the target base station 40b, or what prescribed as a fixed value, or the amount of inflow data indicated by the. In flow amount sending signal sent from the source base station 40a to the radio network controller 50 before the cell change control signal is notified at step S701. That can serially send out data from the radio network controller 50 to the source base station 40b.

Another communication method in which an area covered by a single base station 40 is divided into a smaller plurality of cells (also called as sectors) and communication is performed for each cell is also well known. Although an operation example in a case where the base station with which the mobile station 30 is communicating is changed from the base station 40a to the base station 40b is described in the abovementioned operation example, the cell change method according to the present invention may be applied in a cell change between different sectors in the base station 40a.

Next, referring to FIG. 6 and FIG. 8, another operation example at a cell change will be described. In the operation example, the cell change waiting time tw calculated by the source base station 40a is used instead of the predetermined cell change waiting time tw.

Figure 8:
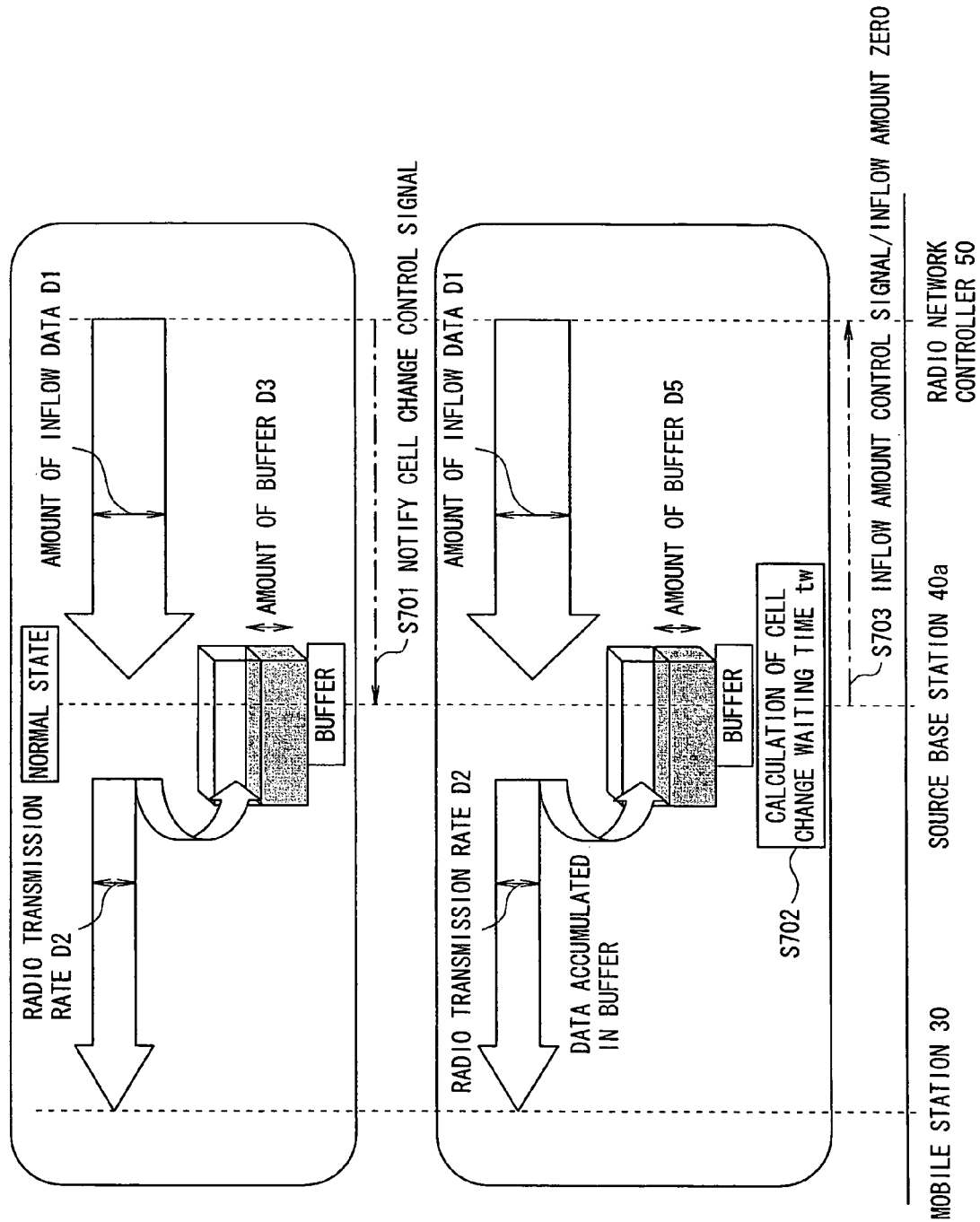
FIG. 8 is a diagram showing relationship between pieces of data in an operation example according to the embodiment.

At the step S701 of FIG. 6, if the source base station 40a receives the cell change control signal, the calculation unit 405 calculates a time in which all the data to be retained in a buffer from now on can be sent based on the amount of buffer D5 stored in a buffer at the moment (which is called "calculation time" hereafter), the amount of inflow data D1, and radio transmission rate D2, and make the time as the cell change waiting time tw (step S702 of FIG. 8). Here, as a method for calculating the cell change waiting time tw, $$tw=(D5+(D1-D2)\cdot t)/D1$$

is known for example. Here, "t" is a time from the calculation time to the cell change timing Tc. If the cell change waiting time tw is obtained when "a notification of a cell change control signal" is received, "t" is equivalent to the time from the time when "a notification of a cell change control signal" is received to the cell change timing Tc.

Next, similar to the abovementioned operation example, the inflow amount controlling function 4021 of the base station 40 sends the inflow amount control signal indicating "inflow amount zero" to the radio network controller 50 at a time before the cell change timing Tc by the cell change waiting time tw (step S703 of FIG. 6 and FIG. 8).

That enables data to be flow from the radio network controller 50 into the source base station 40a as much as possible between when a cell change timing is notified at the step S701 and when an inflow amount control signal is notified as "inflow amount zero" at the step S703, enabling more data to be sent to the mobile station 30.

Although it is controlled so that the amount of inflow data from the radio network controller 50 to the source base station 40a becomes zero during the cell change waiting time tw as the source base station 40a notifies the radio network controller 50 of the inflow amount control signal as "inflow amount zero" at the step S703 in the abovementioned embodiment, the amount of inflow data is not limited to zero. That is to say, if the base station 40 sets the amount of inflow data so that data buffered in the buffer of the source base station 40a and data flowed from the radio network controller 50 can be sent to the mobile station 30 in the cell change waiting time tw, the amount of inflow data needs not be zero.

As described above, the source base station 40a can prevent occurrence of breakage of data sending to the mobile station 30 or data loss by appropriately controlling the amount of inflow data from the radio network controller 50 to the source base station 40a at a cell change that changes the base station communicating with the mobile station 30 from the source base station 40a to the target base station 40b. By enabling the cell change waiting time to be calculated, it can send the maximum data.

The base station, the radio network controller and the radio communication control method according to the present invention can be applied to a communication method performing a hard handover, and can be applied to the HSDPA in 3GPP, the CDMA 2000 1xEV-DO in 3GPP2, for example. Configuration examples of protocol stacks, the mobile station 300, the base station 400 and the radio network controller 500 where the present invention is applied to the HSDPA in 3GPP will be described below.

Figure 9:
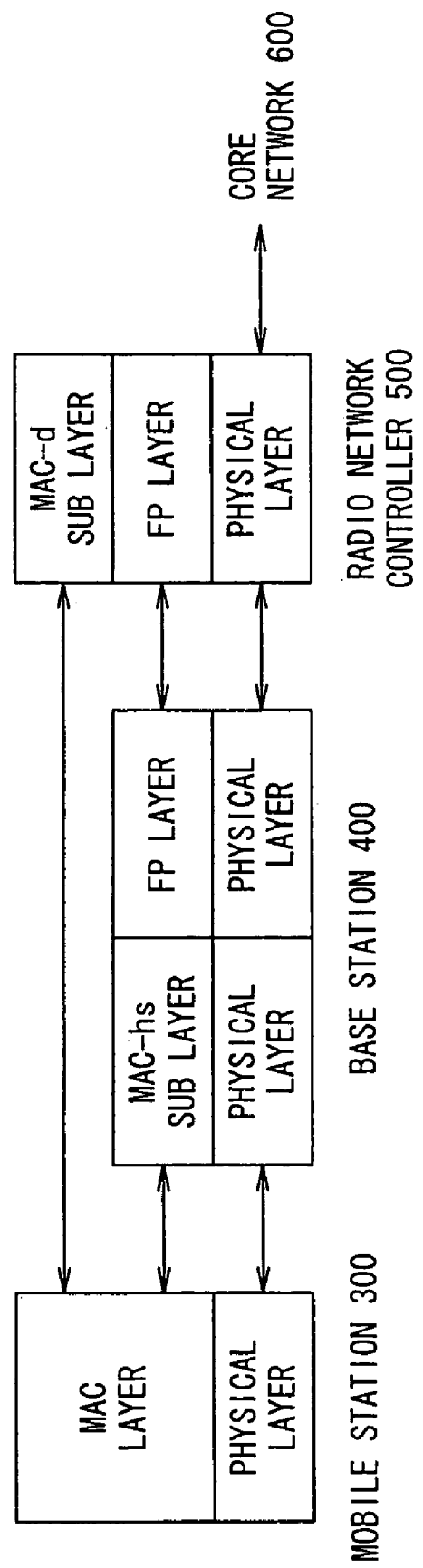
FIG. 9 is a view showing a protocol stack in a mobile communication network according to a modification.

FIG. 9 shows protocol stacks in a mobile communication network adapted to the HSDPA. In the HSDPA, as a MAC-d sub layer and a MAC-hs sub layer of a MAC sub layer are separately placed at each side of the base station 400 and the radio network controller 500, data between entities of MAC sub layers flows between the base station 400 and the radio network controller 500. The flow is called as MAC-d flow.

The protocol stack of the mobile station 300 consists of a physical layer and a MAC layer opposite to the base station 400. The MAC layer is divided into a layer opposite to the MAC-hs sub layer of the base station 400 and a layer opposite to the MAC-d sub layer of the radio network controller 500.

The protocol stack of the base station 400 consists of the physical layer and the MAC-hs sub layer opposite to the mobile station 300, and the physical layer and the FP layer opposite to the radio network controller 500.

The protocol stack of the radio network controller 500 consists of the physical layer and the FP layer opposite to the base station 400 and the MAC-d sub layer opposite to the mobile station 300 as well as a layer (not shown) opposite to the core network 600 side.

Figure 10:
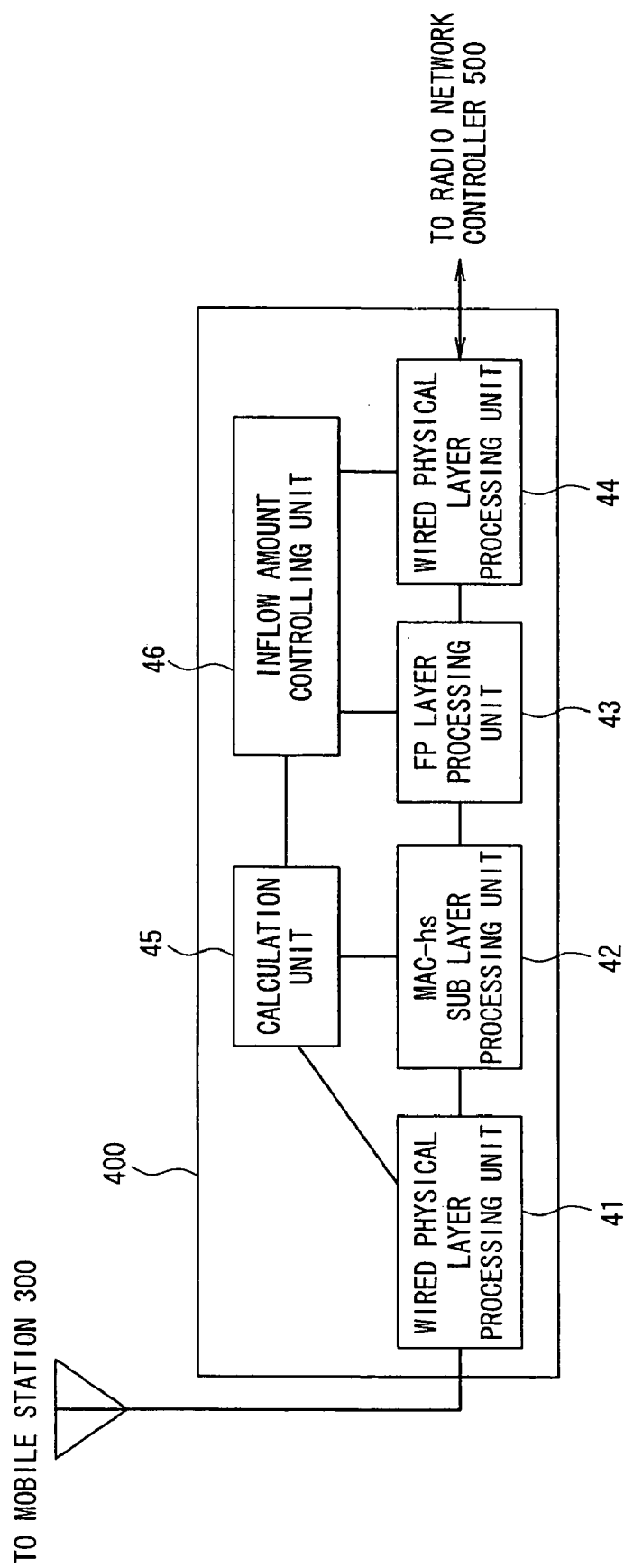
FIG. 10 is a view showing a configuration of a base station according to the modification.

FIG. 10 shows a configuration of the base station 400. A wired physical layer processing unit 44 communicates with the radio network controller 500. A FP layer processing unit 43 communicates with the radio network controller 500 on control signals and further performs processing of MAC-d flow. An inflow amount control unit 46 has the same function as the abovementioned inflow amount controlling function 4021 and sends to the radio network controller 500 inflow amount controlling signals for controlling the amount of inflow data from the radio network controller 500 to the base station 400. The MAC-hs sub layer processing unit 42 performs buffering of data into a buffer in the base station 400 and the like, and also performs signal processing for sending the abovementioned data by the radio physical layer, such as the H-ARQ processing, adaptive modulation/demodulation processing and the like. The radio physical layer processing unit 41 communicates with the mobile station 300. The calculation unit 45 has the same function as that of the abovementioned calculation unit 405, and calculates a cell change waiting time based on the amount of data in the buffer of the base station 400, the amount of inflow data from the radio network controller 500, and a radio transmission rate to the mobile station 300. When the base station 400 becomes the target base station in response to the cell change, the calculation unit 45 calculates appropriate amount of inflow data from the radio network controller 500 based on a radio transmission rate of the base station 400 and notifies it from the FP layer processing unit 43 to the radio network controller 500.

Figure 11:
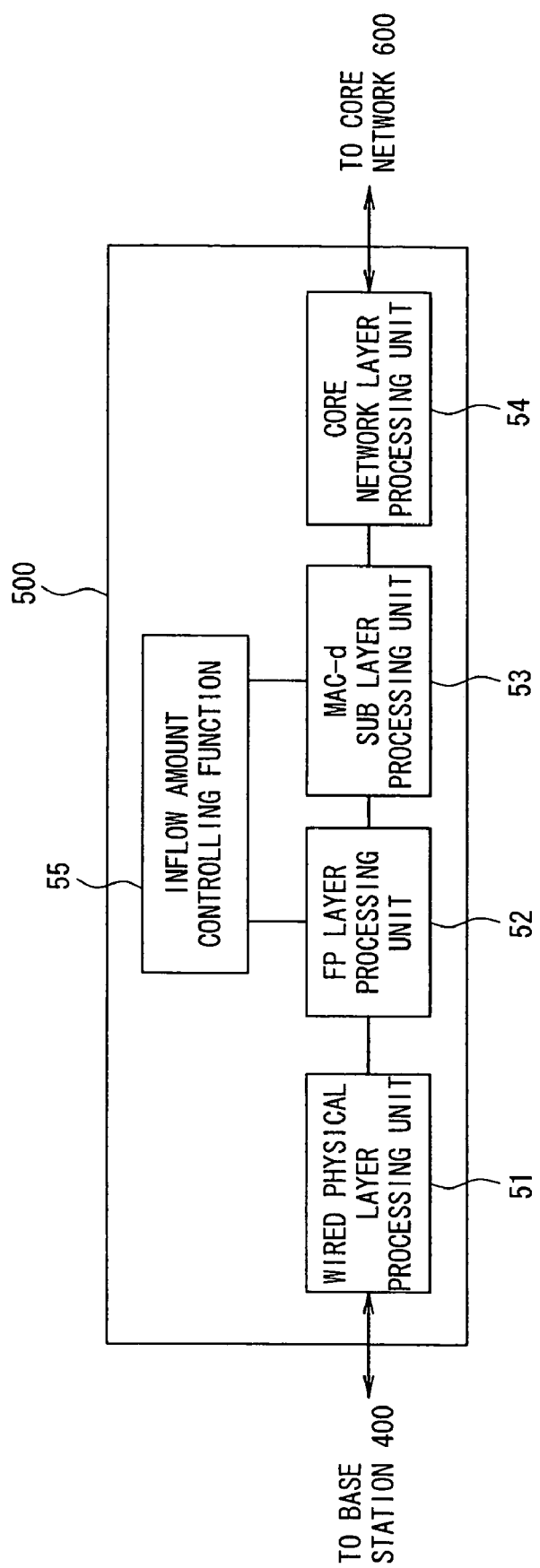
FIG. 11 is a view showing a configuration of a radio network controller according to the modification.
Figure 12:
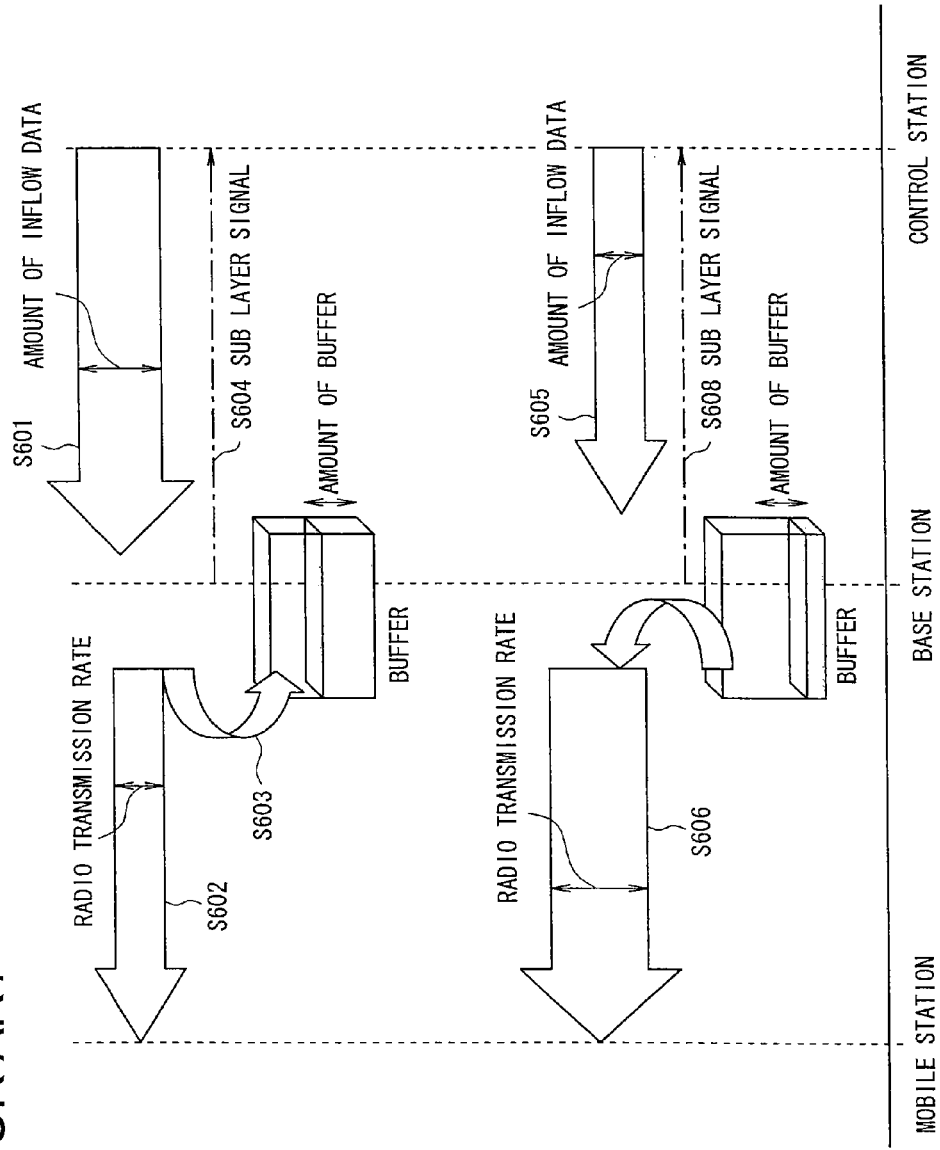
FIG. 12 is diagram showing a conventional method of controlling amount of inflow data.

FIG. 11 shows a configuration of the radio network controller 500. The wired physical layer processing unit 51 communicates with the base station 400. The FP layer processing unit 52 communicates with the base station 400 on control information and further performs the processing of the MAC-d flow. An inflow amount control unit 55 has the same function as that of the abovementioned inflow amount control unit 5021, and controls the amount of inflow data from the radio network controller 500 to the base station 400 based on "an inflow amount control signal" sent from the base station 400. The MAC-d sub layer processing unit 53 communicates with the mobile station 300 and performs signal relaying processing or buffering between the mobile station 300 and the core network 600. The core network layer processing unit 54 communicates with the core network 600.

In a mobile communication network with a configuration of such a HSDPA, the same cell change radio control method as that described in the abovementioned embodiment can be performed to have the same advantage.

In the abovementioned embodiment, the radio network controller is corresponding to a control station.

In the HSDPA system, the inflow amount control signal is corresponding to capacity allocation or HS-DSCH CAPACITY ALLOCTION (HS-DSCH CAPACITY ALLOCATION Frame), and the cell change control signal is one of the RRC messages, such as the radio link reconfiguration commit. The cell change timing Tc is corresponding to the activation time.

The present invention can be used in smooth switching at a cell change in a mobile communication system.

What is claimed is:

1. A base station in a mobile communication system including a plurality of base stations controlled by a control station and a mobile station that communicates with the base stations, comprising:
    an inflow amount controlling function that controls the amount of inflow data from said control station to the base station that is a source base station by sending a control signal to said control station at a cell change that changes a base station communicating with the mobile station from the source base station to another base station; and
    a calculation unit that calculates a time until all the data in a buffer of the source base station is sent to the mobile station, as a cell change waiting time.

2. The source base station according to claim 1, wherein the inflow amount controlling function sends said control signal to said control station at a timing earlier than a cell change timing by the cell change waiting time.

3. A control station in a mobile communication system including a plurality of base stations, according to claim 1, controlled by a control station and a mobile station for communicating with the base stations, the control station comprising:
    an inflow amount controlling function that controls the amount of inflow data to a source base station based on the control signal received from said source base station at a cell change that changes a base station communicating with a mobile station.

4. The source base station according to claim 1, wherein said calculation unit calculates said cell change waiting time based on the amount of data in the buffer of the source base station, the amount of inflow data from said control station, and a radio transmission rate to said mobile station.

5. The source base station according to claim 1, wherein the inflow amount controlling function sends a signal for controlling to make said amount of inflow data zero.

6. The source base station according to claim 1, wherein the inflow amount controlling function controls the amount of inflow data from said control station to the source base station by sending the control signal to said control station, when the source base station becomes the target base station in response to the cell change.

7. A radio communication control method performed in a mobile communication system including a plurality of base stations controlled by a control station and a mobile station that communicates with the base stations, comprising:
    a cell change timing notifying step in which said control station notifies a source base station of a cell change timing;
    a control signal sending step in which said source base station sends a control signal to said control station at a timing earlier than the cell change timing notified at said cell change timing notifying step by a cell change waiting time; and
    an amount of inflow data control step in which said control station controls the amount of inflow data to be sent to said source base station based on said control signal sent at said control signal sending step.

* * * * *